US010427318B1

(12) United States Patent
Groff et al.

(10) Patent No.: US 10,427,318 B1
(45) Date of Patent: Oct. 1, 2019

(54) METHOD OF CREATING A WOOD-BASED FALSE STONE

(71) Applicants: Roxann Groff, Stockton, MO (US); Rolf Groff, Stockton, MO (US)

(72) Inventors: Roxann Groff, Stockton, MO (US); Rolf Groff, Stockton, MO (US)

( * ) Notice: Subject to any disclaimer, the term of this patent is extended or adjusted under 35 U.S.C. 154(b) by 0 days.

(21) Appl. No.: 16/108,196

(22) Filed: Aug. 22, 2018

(51) Int. Cl.
| | |
|---|---|
| *B21F 43/00* | (2006.01) |
| *B23P 13/00* | (2006.01) |
| *B27K 3/10* | (2006.01) |
| *B27M 1/02* | (2006.01) |
| *B27K 3/02* | (2006.01) |
| *A44C 27/00* | (2006.01) |

(52) U.S. Cl.
CPC ............. *B27K 3/10* (2013.01); *A44C 27/001* (2013.01); *B27K 3/0214* (2013.01); *B27M 1/02* (2013.01)

(58) Field of Classification Search
CPC ....................................................... B27K 3/10
See application file for complete search history.

(56) References Cited

U.S. PATENT DOCUMENTS

| | | | | |
|---|---|---|---|---|
| D156,136 S | | 11/1949 | Majeska | |
| 3,700,533 A | | 10/1972 | Schmitz | |
| 4,052,499 A | * | 10/1977 | Goupil | B29C 43/14 264/137 |
| 4,686,251 A | | 8/1987 | Ostermann | |
| 5,113,560 A | * | 5/1992 | Bird | A44C 27/00 29/412 |
| 5,567,206 A | * | 10/1996 | Jankewitz | C09D 15/00 8/402 |
| 2008/0229641 A1 | | 9/2008 | Slautterback | |
| 2009/0100866 A1 | | 4/2009 | Creel | |
| 2012/0070609 A1 | * | 3/2012 | Poppe | B32B 5/16 428/95 |
| 2012/0091028 A1 | | 4/2012 | Fuhrman | |
| 2014/0346835 A1 | * | 11/2014 | Baznik | B60N 2/64 297/452.39 |

\* cited by examiner

*Primary Examiner* — Robert S Walters, Jr.
*Assistant Examiner* — Kristen A Dagenais-Englehart

(57) ABSTRACT

A method of creating a wood-based false stone for producing unique decorative cutouts and jewelry includes collecting a plurality of stems from a plant, cutting each of the plurality of stems to a uniform length, and debarking each of the plurality of stems. The debarked plurality of stems is then dyed, dried completely, and saturated with a resin. The saturated plurality of stems is placed in a mold and compressed. The compressed plurality of stems is removed from the mold and cut into a plurality of slices, each of which is in turn shaped into a plurality of cutouts.

17 Claims, 5 Drawing Sheets

METHOD OF CREATING A WOOD-BASED FALSE STONE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to jewelry making methods and more particularly pertains to a new jewelry making method for producing unique decorative cutouts and jewelry.

BRIEF SUMMARY OF THE INVENTION

An embodiment of the disclosure meets the needs presented above by generally comprising collecting a plurality of stems from a plant, cutting each of the plurality of stems to a uniform length, and debarking each of the plurality of stems. The debarked plurality of stems is then dyed, dried completely, and saturated with a resin. The saturated plurality of stems is placed in a mold and compressed. The compressed plurality of stems is removed from the mold and cut into a plurality of slices, each of which is in turn shaped into a plurality of cutouts.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
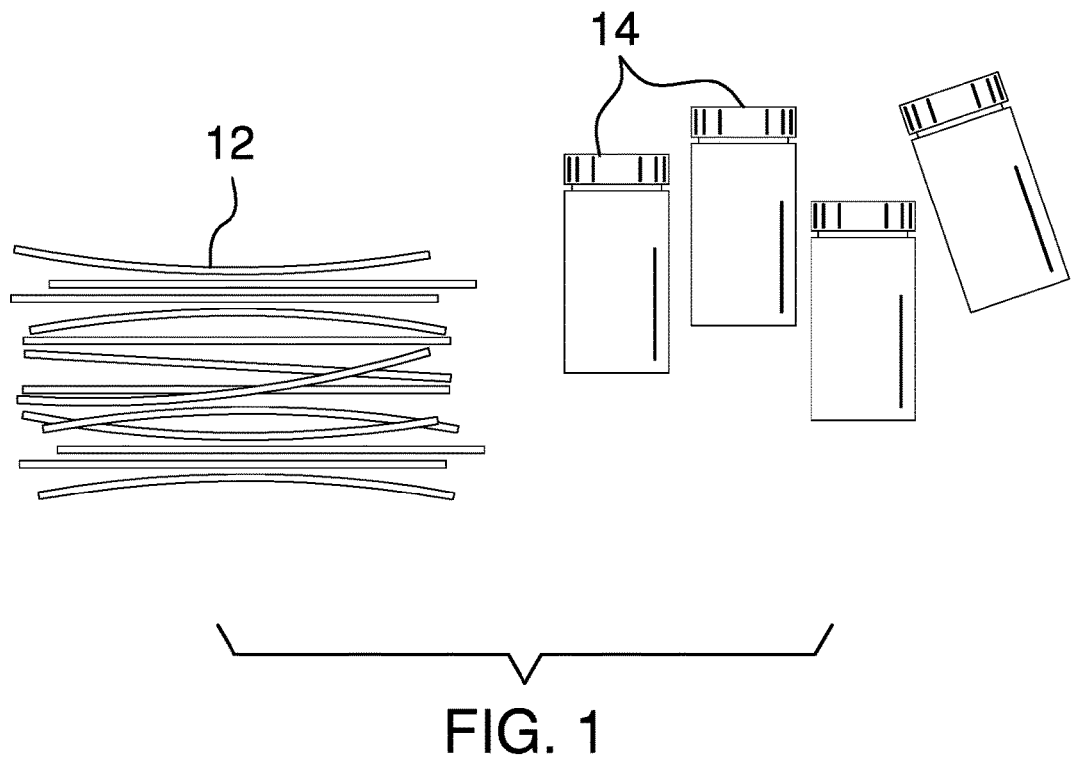
FIG. 1 is a plurality of cut and debarked stems and a plurality of colored dyes to be used in a method of creating a wood-based false stone according to an embodiment of the disclosure.
Figure 2:
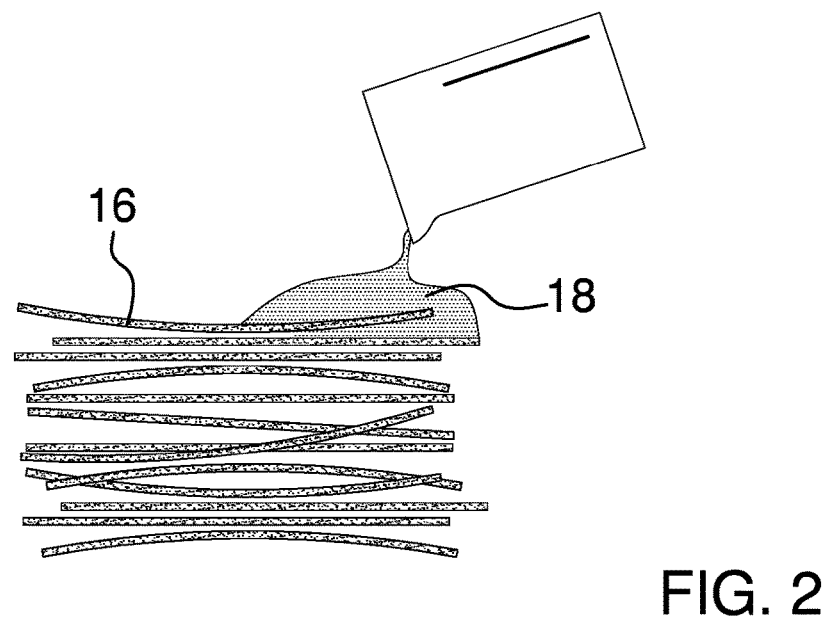
FIG. 2 is a dyed and dried plurality of stems and a glaze for a saturating step of an embodiment of the disclosure.
Figure 3:
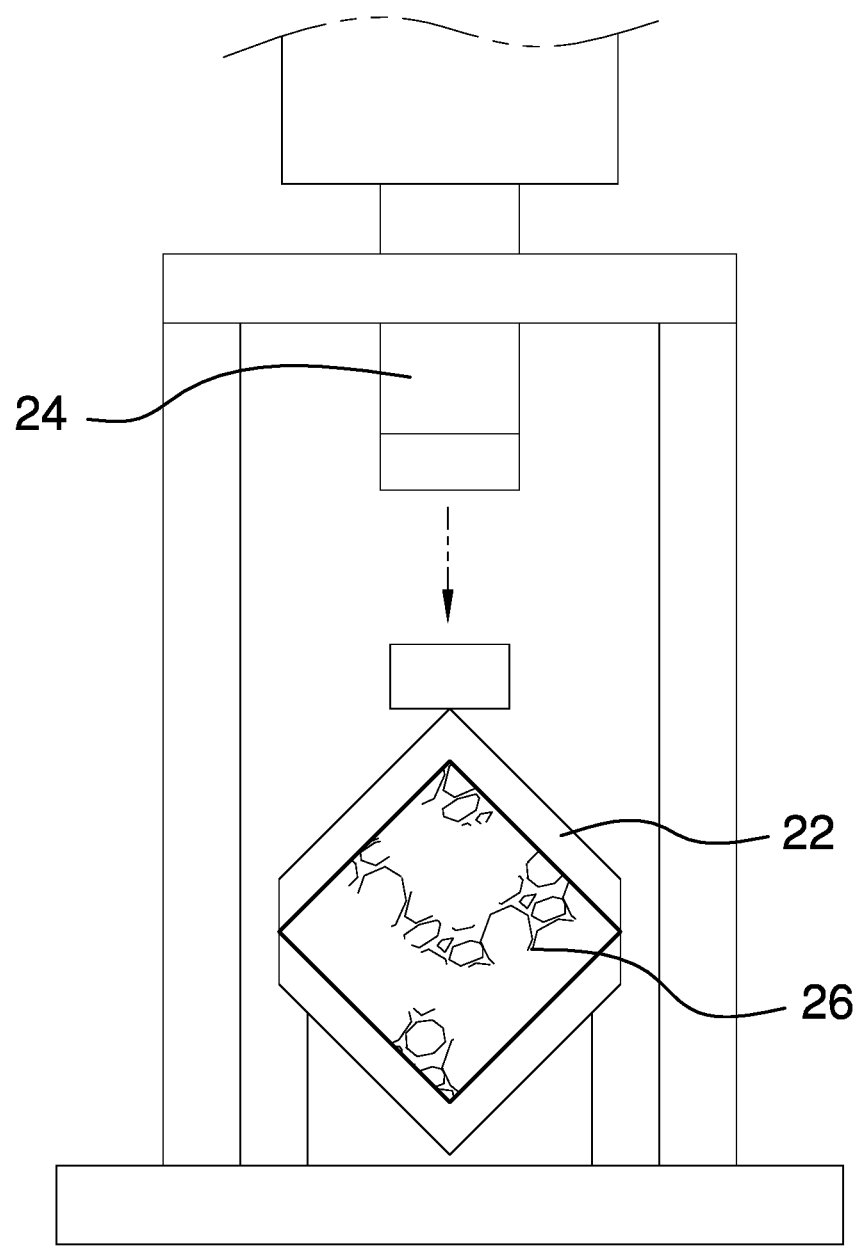
FIG. 3 is a compressed plurality of stems in a mold in a 50-ton press after a compression step of an embodiment of the disclosure.
Figure 4:
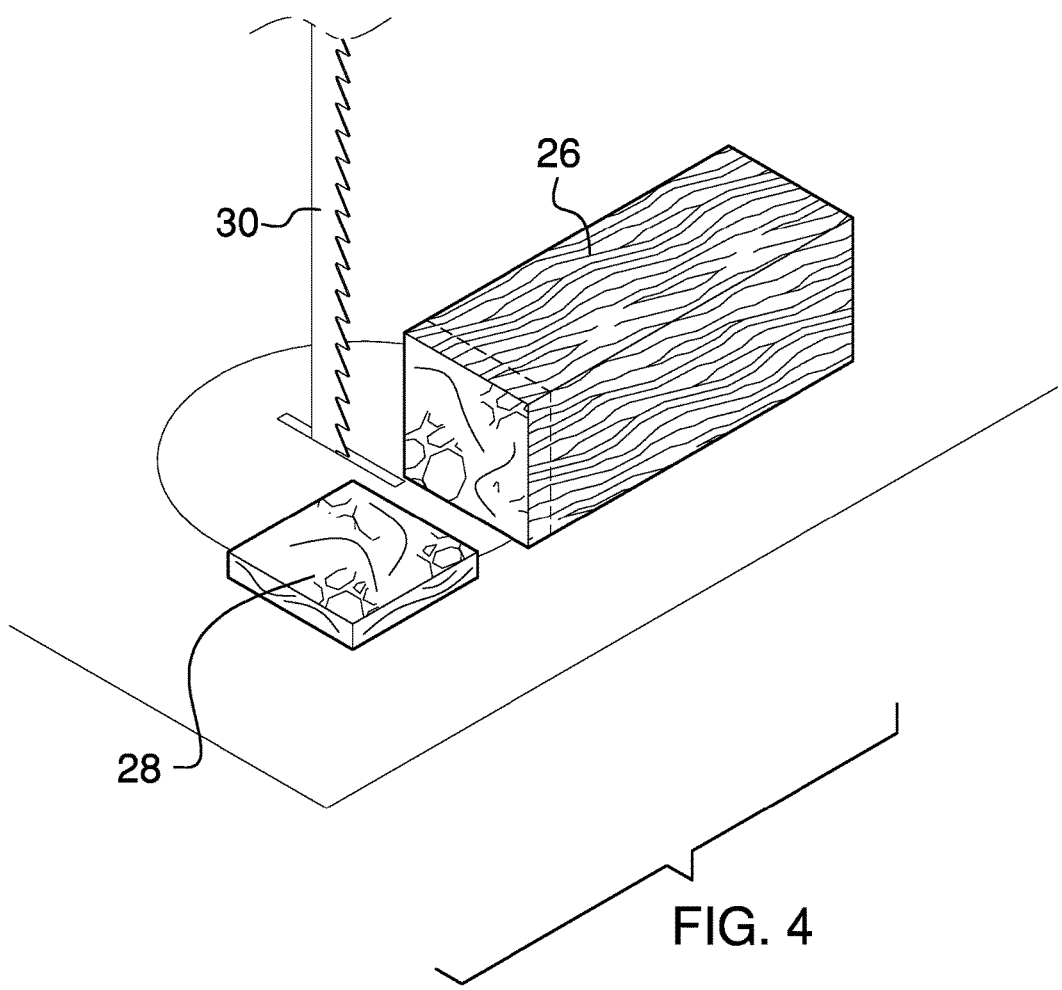
FIG. 4 is a compressed plurality of stems and a band saw for a cutting step of an embodiment of the disclosure.
Figure 5:
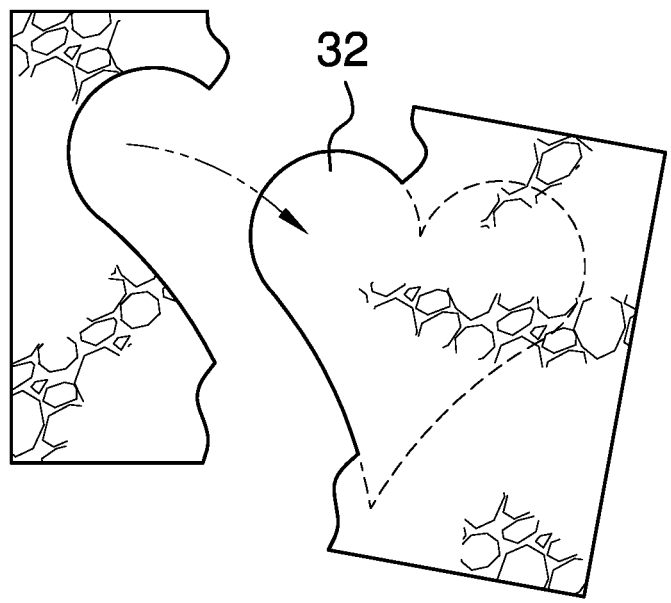
FIG. 5 is a shaped slice and a lacquer for a shaping and a lacquering step of an embodiment of the disclosure.
Figure 5:
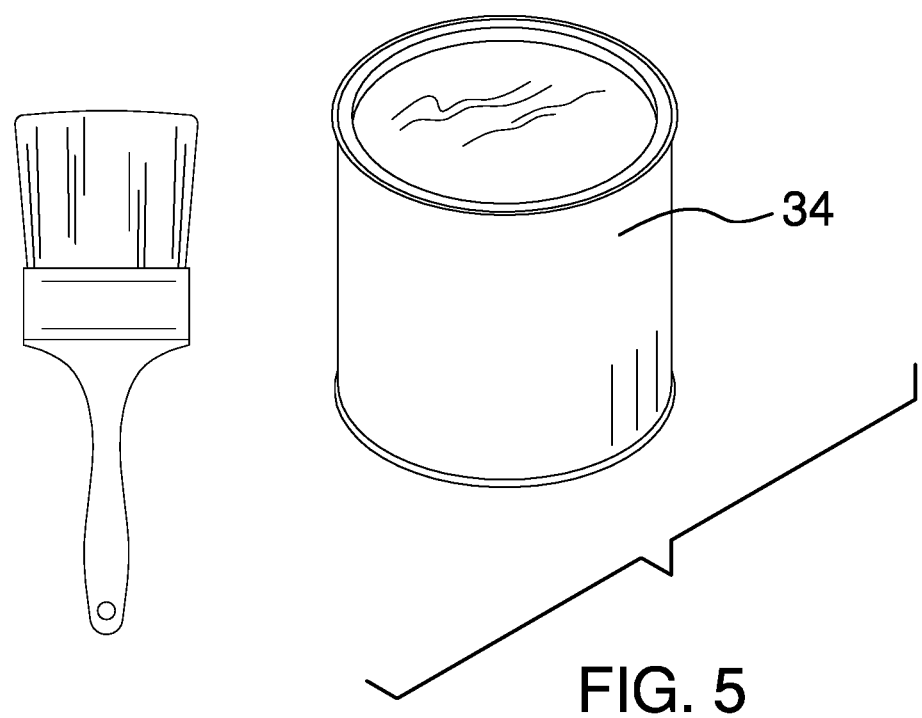
Figure 6:
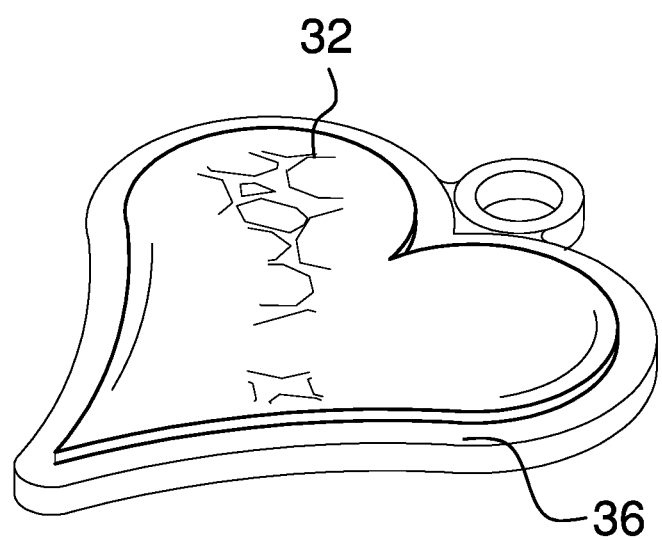
FIG. 6 is a lacquered and shaped false stone set in a jewelry bezel after a setting step of an embodiment of the disclosure.

With reference now to the drawings, and in particular to FIGS. 1 through 6 thereof, a new jewelry making method embodying the principles and concepts of an embodiment of the disclosure and generally designated by the reference numeral 10 will be described.

As best illustrated in FIGS. 1 through 6, the method of creating a wood-based false stone generally comprises collecting a plurality of stems from a rabbit brush plant and cutting each of the plurality of stems to a uniform length. The uniform length may be approximately 25 centimeters. Each of the plurality of stems is debarked 12 and dyed with a plurality of colored dyes 14. Each of the plurality of stems may be dyed at least one color. To maximize absorption of the plurality of colored dyes, the plurality of dyed stems may be placed under sustained pressure. The sustained pressure may be at least 30 psi of pressure applied for at least 48 hours. The plurality of dyed stems 16 should then be allowed to dry completely before being saturated with a resin glaze coat 18.

The plurality of saturated stems 20 is placed in a mold 22 and then compressed using a 50-ton press 24. The compressed plurality of stems 26 is removed from the mold and cut into a plurality of slices 28. The cutting may be performed as a plurality of parallel cuts and a plurality of crosscuts using a bandsaw 30. Parallel cuts and crosscuts create different types of color patterns in the plurality of slices. Each of the plurality of slices is shaped into a plurality of cutouts 32 using the bandsaw or a CNC router. The plurality of cutouts may be a plurality of shapes including, but not limited to, a heart, a circle, a cross, a dolphin, and a dog. The plurality of cutouts may be sanded and polished to create a smooth finish. The can be further smoothed, glossed, and sealed by applying a lacquer 34 and sanding. Each of the plurality of cutouts may be alternately lacquered and sanded a minimum of five times.

In use, each of the lacquered plurality of cutouts may be displayed as a decorative item or set into a jewelry bezel 36, such as a necklace, a bracelet, a ring, or an earring, and worn.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A method of creating a wood-based false stone comprising:
    collecting a plurality of stems from a plant, the plant being a rabbit brush plant;
    cutting each of the plurality of stems to a uniform length;
    debarking each of the plurality of stems;
    applying a dye to each of the plurality of stems;
    allowing the dye to dry completely;
    saturating the plurality of stems in a resin;
    placing the plurality of stems in a mold;
    compressing the plurality of stems within said mold;
    removing the compressed plurality of stems from the mold;
    cutting the compressed plurality of stems into a plurality of slices; and
    shaping each of the plurality of slices into a plurality of cutouts.

2. The method of claim 1 further comprising sanding and polishing each of the plurality of cutouts.

3. The method of claim 2 further comprising lacquering each of the polished plurality of cutouts.

4. The method of claim 3 further comprising setting each of the lacquered plurality of cutouts into a jewelry bezel.

5. The method of claim 1 further comprising applying 30 psi of pressure to the dyed plurality of stems for 48 hours before the drying step.

6. The method of claim 1 wherein the resin is a glaze coat.

7. The method of claim 1 wherein the compression step is accomplished by using a 50-ton press.

8. The method of claim 1 wherein the cutting step is a performed as a plurality of crosscuts and a plurality of parallel cuts of the compressed plurality of stems.

9. The method of claim 8 wherein the cutting step is accomplished by using a band saw.

10. The method of claim 1 wherein the shaping step is accomplished by using a band saw.

11. The method of claim 1 wherein the shaping step is accomplished by using a computer numerical control router.

12. The method of claim 3 wherein the lacquering step comprises applying at least five coats of lacquer.

13. The method of claim 12 further comprising sanding the plurality of cutouts between each coat of lacquer and after a final coat of lacquer.

14. The method of claim 1 wherein the dying step is accomplished by using a plurality of colored dyes.

15. The method of claim 1 wherein the uniform length of the cutting step is approximately 25 centimeters.

16. A method of creating a wood-based false stone comprising:
    collecting a plurality of stems from a rabbit brush plant;
    cutting each of the plurality of stems to a uniform length of approximately 25 centimeters;
    debarking each of the plurality of stems;
    applying a plurality of colored dyes to each of the plurality of stems;
    applying 30 psi of pressure to the dyed plurality of stems for 48 hours;
    allowing the dye to dry completely;
    saturating the plurality of stems in a glaze coat;
    placing the plurality of stems in a mold;
    compressing the plurality of stems within said mold using a 50-ton press;
    removing the compressed plurality of stems from the mold;
    cutting the compressed plurality of stems into a plurality of slices, said cutting being performed as a plurality of parallel cuts and a plurality of crosscuts using a bandsaw;
    shaping each of the plurality of slices into a plurality of cutouts using a band saw;
    sanding and polishing each of the plurality of cutouts;
    alternately lacquering and sanding each of the polished plurality of cutouts a minimum of five times; and
    setting each of the lacquered plurality of cutouts into a jewelry bezel.

17. A method of creating a wood-based false stone comprising:
    collecting a plurality of stems from a rabbit brush plant;
    cutting each of the plurality of stems to a uniform length;
    debarking each of the plurality of stems;
    applying a plurality of colored dyes to each of the plurality of stems;
    applying 30 psi of pressure to the dyed plurality of stems for 48 hours;
    allowing the dye to dry completely;
    saturating the plurality of stems in a glaze coat;
    placing the plurality of stems in a mold;
    compressing the plurality of stems within said mold using a 50-ton press;
    removing the compressed plurality of stems from the mold;
    cutting the compressed plurality of stems into a plurality of slices, said cutting being performed as a plurality of parallel cuts and a plurality of crosscuts using a bandsaw;
    shaping each of the plurality of slices into a plurality of cutouts using a computer numerical control router;
    sanding and polishing each of the plurality of cutouts;
    alternately lacquering and sanding each of the polished plurality of cutouts a minimum of five times; and
    setting each of the lacquered plurality of cutouts into a jewelry bezel.

* * * * *